United States Patent
Tuttle

Patent Number: 6,108,001
Date of Patent: Aug. 22, 2000

[54] DYNAMIC CONTROL OF VISUAL AND/OR AUDIO PRESENTATION

[75] Inventor: Mathew Paul Tuttle, Apalachin, N.Y.

[73] Assignee: International Business Machines Corporation, Armonk, N.Y.

[21] Appl. No.: 08/065,720

[22] Filed: May 21, 1993

[51] Int. Cl.$^7$ .................................................. G06F 17/21
[52] U.S. Cl. ........................................................ 345/302
[58] Field of Search .................................. 395/154, 152, 395/118; 352/240; 434/228, 310, 307 R; 364/423; 345/1; 353/15; 348/383, 744

[56] References Cited

U.S. PATENT DOCUMENTS

| | | | |
|---|---|---|---|
| 3,654,619 | 4/1972 | Tishman | 434/228 |
| 3,736,411 | 5/1973 | Berndt | 364/423 |
| 3,899,662 | 8/1975 | Kreeger et al. | 395/138 |
| 4,122,613 | 10/1978 | Karalus et al. | 434/310 |
| 4,470,675 | 9/1984 | Di Gianfilippo et al. | 353/15 |
| 4,689,022 | 8/1987 | Peers et al. | |
| 4,734,779 | 3/1988 | Levis et al. | 348/383 |
| 4,747,146 | 5/1988 | Nishikawa et al. | 382/1 |
| 4,752,836 | 6/1988 | Blanton et al. | 358/342 |
| 4,846,694 | 7/1989 | Erhardt | 434/365 |
| 4,876,597 | 10/1989 | Roy et al. | 348/143 |
| 4,899,292 | 2/1990 | Montagna et al. | 395/147 |
| 4,928,253 | 5/1990 | Yamauchi et al. | 345/201 |
| 4,951,151 | 8/1990 | Sorenson et al. | 348/744 |
| 5,018,082 | 5/1991 | Obata et al. | 395/154 |
| 5,029,112 | 7/1991 | Sakamoto et al. | 395/118 |
| 5,035,624 | 7/1991 | Hosoya et al. | |
| 5,065,345 | 11/1991 | Knowles et al. | 395/154 |
| 5,081,449 | 1/1992 | Kurosu et al. | 345/115 |
| 5,101,197 | 3/1992 | Hix et al. | 345/87 |
| 5,109,482 | 4/1992 | Bohrman | 395/154 |
| 5,111,409 | 5/1992 | Gasper et al. | 395/152 |
| 5,123,088 | 6/1992 | Kasahara et al. | 395/159 |
| 5,138,700 | 8/1992 | Kinoshita | 395/161 |
| 5,167,021 | 11/1992 | Needham | 395/275 |
| 5,191,410 | 3/1993 | McCalley et al. | 348/13 |
| 5,191,645 | 3/1993 | Carlucci et al. | 395/159 |
| 5,195,092 | 3/1993 | Wilson et al. | 370/94.2 |
| 5,214,758 | 5/1993 | Ohba et al. | 395/164 |
| 5,237,648 | 8/1993 | Mills et al. | 395/133 |
| 5,262,765 | 11/1993 | Tsumura et al. | 345/122 |
| 5,264,933 | 11/1993 | Rosser et al. | 348/578 |
| 5,307,055 | 4/1994 | Baskin et al. | 345/1 |
| 5,353,391 | 10/1994 | Cohen et al. | 395/135 |
| 5,355,450 | 10/1994 | Garmon et al. | 395/162 |
| 5,385,475 | 1/1995 | Sudman et al. | 434/308 R |
| 5,386,493 | 1/1995 | Degen et al. | 395/2.76 |

FOREIGN PATENT DOCUMENTS 0355627  2/1990  European Pat. Off. .

*Primary Examiner*—Joseph H. Feild
*Attorney, Agent, or Firm*—Arthur J. Samodovitz

[57] ABSTRACT

A system provides dynamic control of a visual and/or audio presentation. The system comprises a storage such as DASD for data defining "stories" i.e. a multiplicity of still images or video segments and/or respective audio clips. A program file defines a list of the stories for the presentation, a sequence for presenting the stories in the list, and a time interval for presenting each story or between successive stories in the sequence. A control program directs display of the stories in the list in the sequence according to the time interval. The time interval can be dynamically changed during the presentation by a user via a system console. Pursuant to such a change, the subsequent stories are presented according to the changed time interval. This permits the user to tailor the speed of the presentation to the audience. One or more of the stories is divided into elements providing different levels of information, and the control program directs display of most or all of the elements if the interval is relatively long and directs display of fewer elements or a single element if the interval is relatively short.

7 Claims, 3 Drawing Sheets

DYNAMIC CONTROL OF VISUAL AND/OR AUDIO PRESENTATION

BACKGROUND OF THE INVENTION

The invention relates generally to visual and/or audio presentation systems, and deals more particularly with dynamic control of the presentation.

For many types of presentations, it is necessary to employ visual and/or audio aids. The visual aids may take the form of slides, images generated on a video display monitor, images generated by a video projector, or transparencies or LCD images which are displayed with an overhead projector. Audio "clips" can be stored on disk and synchronized with the slides, transparencies or images. There are several previously known systems for controlling the visual and/or audio presentations. A well known slide carousel can be filled with slides, displayed on a screen with a projector, and incrementally advanced or regressed at any time with a manual switch. An IBM Storyboard program can define a list and sequence of video images and display them. The Storyboard program can automatically advance from image to image in the sequence according to time intervals written in the program or can wait for a manual cue from the operator to advance. The Storyboard program also permits manually controlled incremental advances in the sequence or regress back to the last full image in the sequence. An IBM AVC program is similar to the Storyboard program except cannot be regressed dynamically.

While these prior art systems provide some dynamic control on the presentation by permitting incremental advances or regressions, the operator may require additional dynamic control to suit the immediate audience, respond to questions and add material deemed appropriate during the presentation.

A general object of the present invention is to provide a visual and/or audio presentation system which provides greater dynamic control than the aforesaid prior art.

SUMMARY OF THE INVENTION

The invention resides in a system for dynamically controlling a visual and/or audio presentation. The system comprises a storage such as DASD for data defining "stories" i.e. a multiplicity of still images or video segments and/or respective audio clips. A program file defines a list of the stories for the presentation, a sequence for presenting the stories in the list, and a time interval for presenting each story or between successive stories in the sequence. A control program directs display of the stories in the list in the sequence according to the time interval. The time interval can be dynamically changed during the presentation by a user via a system console. Pursuant to such a change, the subsequent stories are presented according to the changed time interval. This permits the user to tailor the presentation speed to the current audience.

According to one feature of the present invention, if the interval is relatively long, the control program directs display of a large portion or all of the story but if the interval is relatively short the control program directs display of a small portion of the story. The reason is that with the shorter time interval, the user may not be able to explain and the audience may not be able to absorb all the information within each full story.

According to another feature of the present invention, the user can dynamically request that any story in the sequence be presented next, and the control program complies.

DETAILED DESCRIPTION OF THE PREFERRED EMBODIMENTS

Figure 1:
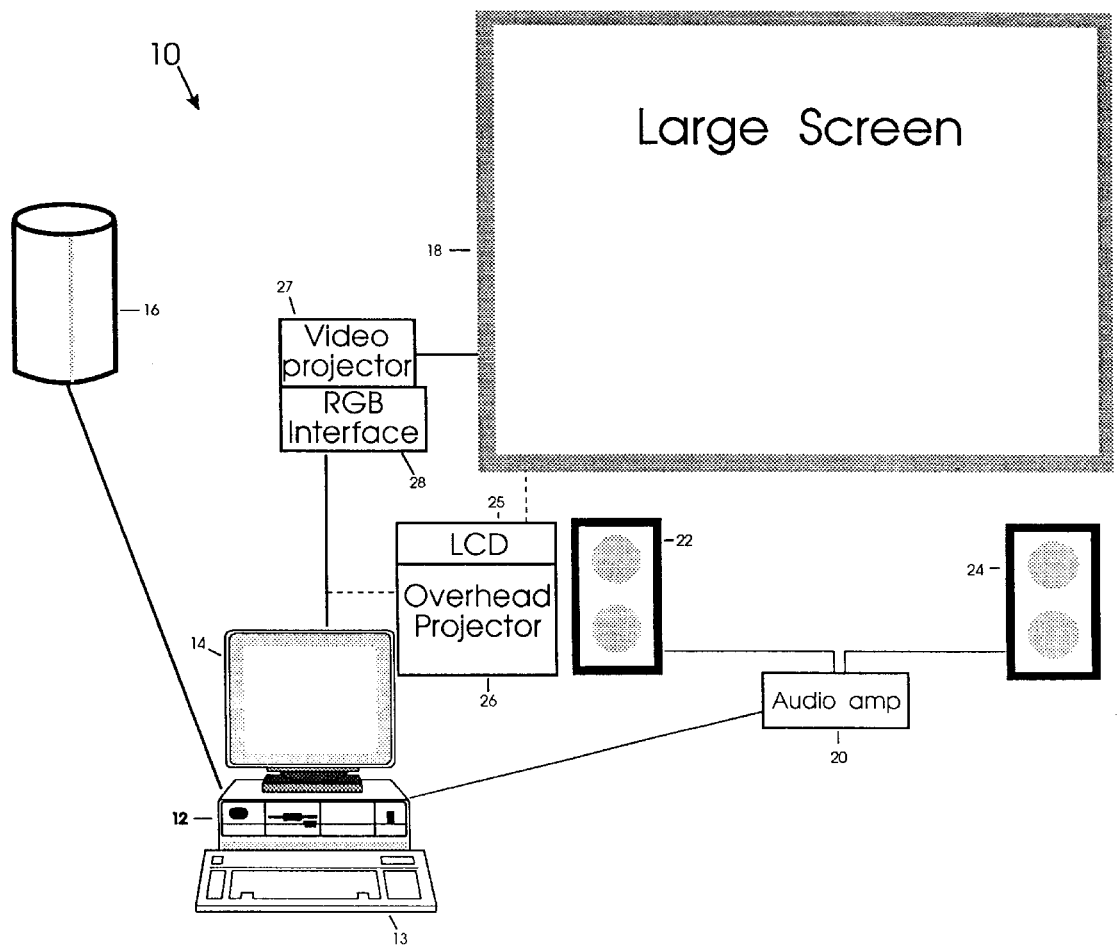
FIG. 1 is a block diagram of a video and audio presentation system according to the present invention.

Referring now to the figures in detail wherein like reference numerals indicate like elements throughout the several views, FIG. 1 illustrates a visual and audio presentation system generally designated 10 according to the present invention. System 10 comprises a personal computer 12, a keyboard 13, a video display monitor 14, and external disk storage 16 for data defining still images or video segments and respective audio "clips". The audio clips can be background music or even speech. The system can display the visual data in a variety of ways which are all symbolized by a large screen 18, and play the audio using an amplifier 20 and speakers 22 and 24. The large screen 18 can be a projection screen/surface and the image generated on a transparent LCD 25 and projected using an overhead projector 26 or projected directly by a video projector 27 via an RGB interface 28. Alternately, the screen 18 can be another video display monitor and driven by the same video subsystem that drives PC monitor 14.

Figure 2:
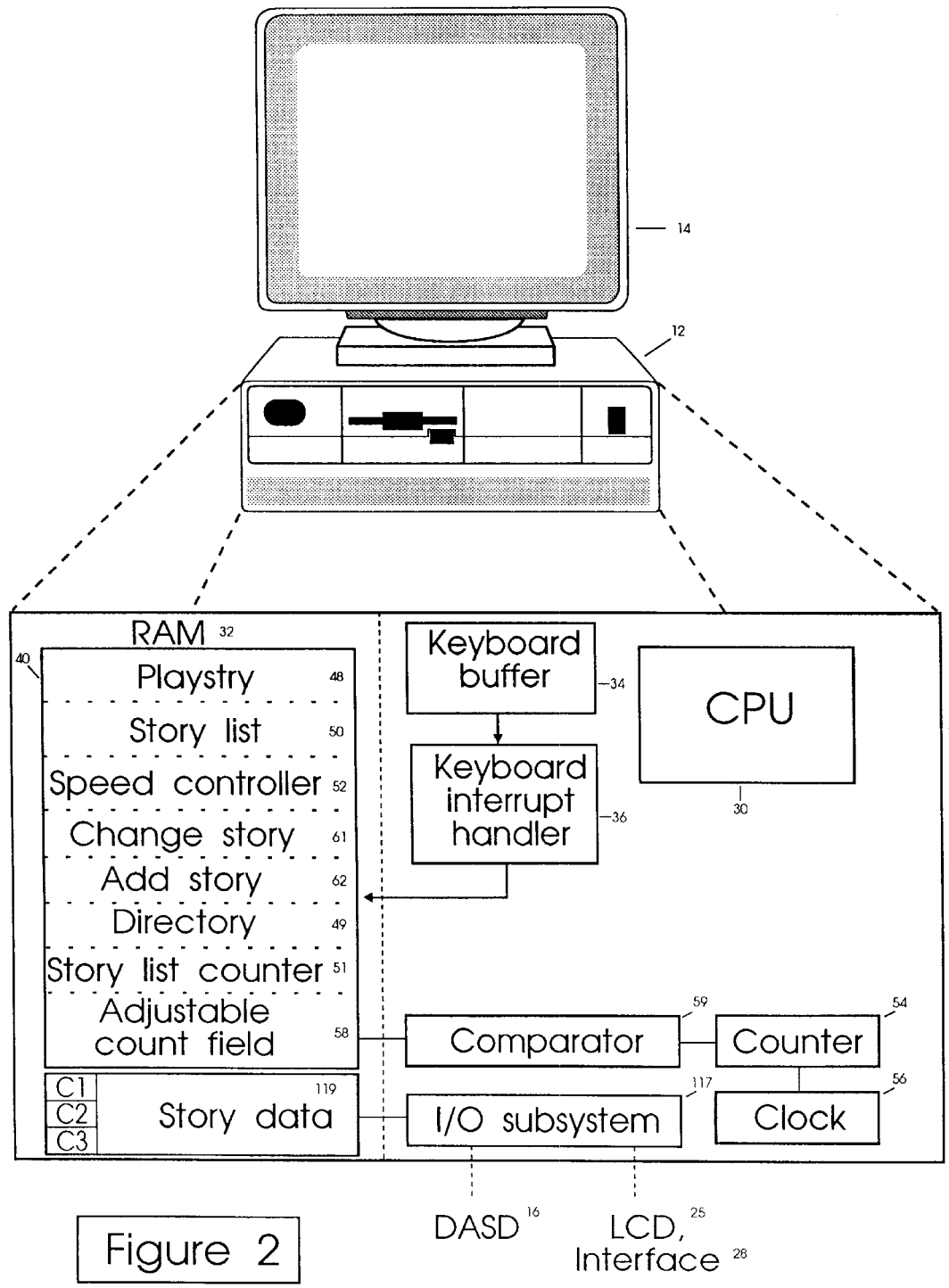
FIG. 2 is a more detailed block diagram of a computer system within the presentation system of FIG. 1.

FIG. 2 illustrates computer 12 in more detail. Computer 12 comprises a CPU 30, random access memory (RAM) 32, a keyboard buffer 34 for receiving control inputs from the keyboard, a keyboard interrupt handler 36 for transforming the control inputs to corresponding interrupts to the CPU, and a group or program, routines and files generally designated 40 for dynamically controlling the visual and audio presentation in response to user inputs and corresponding interrupts. A "playstory" program 48 is the master program for the dynamic control. A directory 49 is read from external storage 16 and contains a list by name and address of all "stories", i.e. still images or video segments and respective audio clips stored in external storage 16. Story list file 50 contains a list of all stories by name that are initially included in a particular presentation and a default sequence for presenting them. A story list counter 51 is incremented after each story in the sequence is presented and indicates the number of the next story to be presented. The story list and default sequence were previously programmed. A speed controller routine 52 controls the interval between stories or interval between initial display of successive stories. By way of example, the interval is controlled as follows. A resetable counter 54 is incremented by a system clock 56 and compared to the contents of an adjustable count field 58. When the count of the counter equals the contents of the count field 58, then a comparator 59 signals to advance to the next story. The speed controller routine can dynamically change the contents of the count field during the presentation to change the time interval. A change story routine 60 can dynamically change the number of the story counter 51 to dynamically jump, forward or backward, to any story in the list and continue therefrom in the sequence. An add story routine 62 can dynamically add a story to the story list anywhere in the story list sequence. As described below, all of these dynamic changes are made pursuant to user input via the console (i.e. keyboard 13, monitor 14 and optional mouse not shown).

Figure 3:
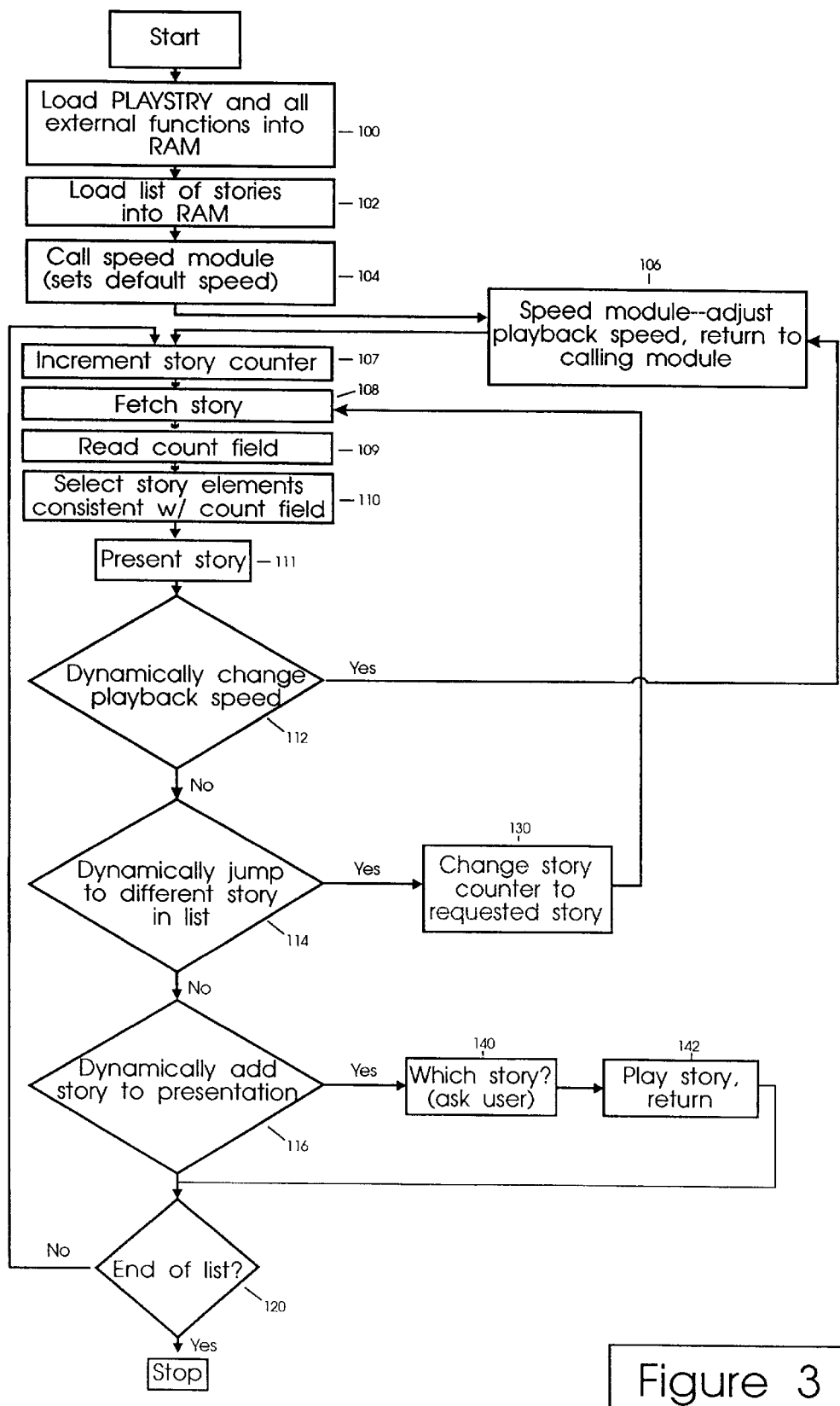
FIG. 3 is a flow chart which illustrates components of the presentation system of FIG. 1.

FIG. 3 illustrates how system 10 executes the presentation and how a user can dynamically control system 10 during a presentation to change the story list, presentation sequence and time interval between stories or between initial display of successive stories. In step 100, the user loads the play story program 48 and routines 52, 60 and 62. Then, the user loads the story list file 50 which was defined earlier (step 102). Once the play story program and story list are loaded, the play story program 48 requests a fetch of the directory 49 from external storage 16. Next, the user calls the speed controller routine to define a default time interval between stories (step 104). The user specifies the interval in seconds or selects a slow, medium or fast speed, via the keyboard and the speed controller converts the interval/speed selection to the corresponding count and writes the count in field 58 (step 106). Alternately, the default interval could have been defined earlier and stored in a file.

Next, the play story program increments the story list counter to one to indicate the first entry in the story list (step 107). In response, the play story program reads the incremented story list counter to identify the first story and then reads the directory to obtain the address of the first story in external storage. Then, the play story program requests an I/O subsystem 117 to fetch the first story 119 from external storage into RAM (step 108).

In accordance with one aspect of the present invention, not all of the data for each selected story is presented when the time interval is medium or short, i.e. the presentation speed is medium or fast. This is because under such conditions, the operator may not have time to discuss and the audience may not have time to absorb all the data. As illustrated in FIG. 2, the story 119 (and each other story) comprises a number of discrete elements such as visual sentences, "bullet" phrases, figures, etc. and respective audio segment of background music or speech. Each story element is prefaced by a minimum time interval or count specification which indicates the minimum actual time interval under which the story element should be presented. In FIG. 2, these minimum time interval or count specifications are indicated as C1, C2 and C3. Before the play story program presents the story, the play story program compares contents of the count field 58 (which indicates the actual time interval) to each minimum time interval specification in the story to determine which story elements should be presented (step 109). Only those story elements which have a minimum time interval specification less than or equal to the contents of the count field 58 are presented when the story is selected. In the preferred embodiment of the invention, at least one story element from each story should be presented regardless of actual time interval so the minimum time interval specification is set to zero for this story element. For example, these types of story elements may provide the highest level (least detailed) information. However, other story elements may be presented only for long and medium time intervals/slow and moderate speeds. These story elements may provide lower level (more detailed) information. Still other story elements may be presented only for long time intervals/slow speeds. These story elements may provide still lower level (still more detailed) information. In step 110, the play story program selects the proper story elements for presentation, and then requests the I/O subsystem to present the proper story elements from the first story (step 110).

After the interval determined by the count field 58 is completed, the play story program requests the I/O subsystem to halt the presentation of this story. If the user does not desire to change the content or sequence of the story list or the time interval, then decisions 112, 114 and 116 lead to decision 120 in which the play story program compares the number of the story just displayed to the total in the story list to determine if the presentation is complete. If not, then the play story program jumps back to step 107, increments the story counter and requests that the next story in the sequence be fetched and presented in part or full as described above (steps 108–110). This iterative execution of steps 108 and 110 continues for each of the stories in the story list in the default sequence according to the default time interval unless the user intervenes by dynamic entry through the console.

However, if the user enters a new story interval (decision 112), then the play story program calls the speed controller routine 52 to change the contents of the count field to correspond to the new user entered interval (step 106). This new count field is used for timing subsequent stories in the list and determining which story elements to present in each story. If the user desires to omit one or more stories in the sequence or jump to another story in the sequence, the user enters the identity of the story that the user desires to present (decision 114), and the play story program calls the change story routine 60. In response, the change story routine 60 changes the story counter to the number that corresponds to the user selection (step 130), and this story will be the next one presented. (The stories listed in the sequence after the selected one will be presented after the selected one unless the user intervenes again.) If the user desires to add a story to be presented next (decision 116), then the play story program calls the add story routine 62 which then queries the user to name the story (step 140). After the user names the story, the add story routine requests the I/O subsystem to fetch the story from external storage and then present the new story next (step 142) and returns to decision 120. In the illustrated embodiment, this new story is not added to the story list. Thus, the operator during the presentation can dynamically change the time interval, add a story or jump to any story in the sequence, by means of the console. This dynamic control permits the operator to suit the presentation to the current audience and quickly access any story within or outside the current story list. This is helpful to answer questions and present new material which the operator deems appropriate during the presentation.

Based on the foregoing, a dynamically controllable presentation system has been disclosed according to the present invention. However, numerous modifications and substitutions can be made without deviating from the scope of the present invention. For example, the add story routine 62 can be modified as follows. When invoked by the user, the add story routine can query the user to name the story and a story which it should follow by name or relative position in the story list and then add the story to the proper location in the story list for subsequent display and/or play. Therefore, the invention has been disclosed by way of illustration and not limitation, and reference should be made to the following claims to determine the scope of the present invention.

I claim:

1. A system for dynamically controlling a visual presentation, said system comprising:

means for storing a multiplicity of still images;

means for defining a time interval for displaying each of said still images in a presentation;

means for directing sequential display of said still images in said presentation according to said time interval for each image; and means, responsive to user input during the presentation, for dynamically changing the time interval for displaying subsequent still images in the presentation; and wherein the directing means directs display of said subsequent still images in the presentation according to the changed time interval; and for at least one of said images, the storing means also stores additional detail; and the directing means directs display of said additional detail in the presentation if the display time interval is longer than a predetermined duration but does not direct display of said additional detail if the display time interval is shorter than said predetermined duration.

2. A system as set forth in claim 1 wherein said one image is divided into elements, and the storing means stores a respective parameter in conjunction with each of said elements, said parameter indicating a minimum time interval required to display the element in said presentation, and the directing means compares said parameter for each element to the defined display time interval to determine if the element should be displayed.

3. A system for dynamically controlling a visual presentation, said system comprising:

means for storing a multiplicity of still images;

means for defining a time interval for displaying each image or representative portion thereof; and means for directing sequential display of said images or representative portion thereof in said presentation according to said time interval such that if said time interval is greater than a predetermined duration, said image is displayed, and if said time interval is less than the predetermined duration, only said representative portion is displayed.

4. A system as set forth in claim 3 wherein said image contains more detailed information than said representative portion of said image.

5. A system as set forth in claim 3 wherein said image is divided into elements, the storing means stores a respective parameter in conjunction with each of said elements, said parameter indicating a minimum time interval required to display the respective element, and the directing means compares said parameter for each element to the display time interval to determine if the element should be displayed in the presentation.

6. A system as set forth in claim 3 wherein said images comprise a video segment.

7. A system as set forth in claim 3 wherein the display time interval for all of said images is the same.

* * * * *